Patented Dec. 26, 1939

2,185,163

UNITED STATES PATENT OFFICE 2,185,163

POLYOXYALKYLENE AMMONIUM COMPOUNDS AND PROCESS OF PREPARING THEM

Heinrich Ulrich, Ludwigshafen-on-the-Rhine, Germany, assignor to I. G. Farbenindustrie Aktiengesellschaft, Frankfort - on - the - Main, Germany No Drawing. Application July 21, 1936, Serial No. 91,801. In Germany July 24, 1935

15 Claims. (Cl. 260—457)

The present invention relates to the production of polyoxyalkylene ammonium compounds and process of preparing them.

I have found that valuable nitrogenous condensation products i. e. polyoxyalkylene ammonium compounds, are obtained by causing amine oxides of tertiary amines to react at elevated temperature in the presence of water, preferably under superatmospheric pressure, with alkylene oxides, as for example ethylene oxide, propylene oxide, 1,2-butylene oxide, glycide, epichlorhydrine and the like. The reaction, which may also be carried out in the presence of organic solvents, as for example low molecular aliphatic alcohols, acetone, diethyl ether, cyclohexanol and the like proceeds very readily. The condensation is carried out for example by dissolving or distributing the said amine oxides in water or in one of the aforesaid solvents and causing the alkylene oxide at a temperature above 50° C., preferably between 90° and 110° C. to react with the amine oxides employed.

Amine oxides of tertiary amines suitable as initial material in the present process are for example trimethylamineoxide, triethylamine oxide, tributylamine oxide, phenyl dimethylamine oxide or p-tolyl-dipropyl amine oxide. Amine oxides containing a high molecular aliphatic radicle particularly those containing an aliphatic radicle with from 8 to 18 carbon atoms may be advantageously employed as initial material. Such amine oxides are for example dimethyloctylamine oxide, dimethyl dodecylamine oxide, dihydroxyethylcetylamine oxide, diethyl 9.10-octodecenylamine oxide, methyl-didodecylamine oxide or methyl phenyloleyl amine oxide.

The said amine oxides may also contain in the organic radicles substituents such as halogen atoms, carboxyl, ester, ether or hydroxy groups.

According to this process water-soluble products are obtained which have an alkaline reaction in contrast to the initial materials which are entirely neutral. Presumably they possess the following formula

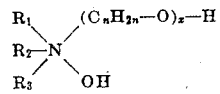

wherein $R_1$, $R_2$ and $R_3$ stand for organic radicles and $x$ indicates the number of the oxyalkylene groups contained in the polyoxyalkylene radicles which are attached by oxygen to the nitrogen atom. The products obtained according to this process may be employed with advantage as assistants in the textile, leather and lacquer industries, for example as wetting, cleansing, emulsifying and dispersing agents. Their usefulness for the said purposes may be improved in many cases by employing them together with soaps or substances having soap-like character or with glue, gelatine or other organic colloidal substances, as for example water-soluble varieties of gum, vegetable mucilages or sulphite cellulose waste liquor, or with organic solvents, or with two or more of these substances. In particular, with the aid of the said products organic solvents may be dissolved or emulsified in water to a considerable extent whereby products are obtained which are suitable for example for washing, bleaching and dyeing textiles, even in acid baths, and also for the dispersion of further substances. They may also be employed, however, for stripping vat dyestuffs with the co-employment of hydrosulphites. The unsulphonated condensation products may also be employed with advantage for the impregnation of fibrous materials in order to increase their fastness to water. Furthermore the products also have a more or less marked disinfecting action.

For many purposes it is advantageous subjecting the condensation products to the sulphonation. This may be effected by treating the condensation products with sulphonating agents such as concentrated sulphuric acid, oleum or chlorsulphonic acid. The sulphonation may be carried out at comparatively low temperatures, such as from 5° below zero to 25° C. and while employing organic solvents, such as carbon tetrachloride, either and the like, or while adding water-binding substances for example phosphoric acid anhydride or acetic acid anhydride. Probably the sulphuric acid group enters into the free hydroxyl group on the end of the polyoxyalkylene radicle, thus for example products with the following constitution may be obtained:

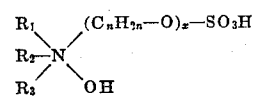

($R_1$, $R_2$ and $R_3$ are organic radicles; $x$ means the number of the oxyalkylene groups).

After neutralization of the sulphonation product with alkaline reacting substances such as caustic soda solution, sodium carbonate, ammonia or aliphatic amines, products are obtained which are easily soluble in water and which possess a high washing and dispersing power.

The following examples will further illustrate the nature of this invention but the invention is not restricted to these examples. The parts are by weight.

Example 1

90 parts of 63 per cent dimethyldodecylamine oxide containing water and 155 parts of ethylene oxide are heated in an autoclave at from 90° to 100° C. until pressure is no longer detectable. The resulting condensation product is a syrup readily soluble in water, acids and alkalies; in aqueous and alcoholic solution it has an alkaline reaction.

Example 2

100 parts of a water containing 70 per cent amine oxide corresponding to the formula

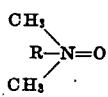

(R=alkyl radicle corresponding to the palm kernel oil fatty acids) are dissolved in 100 parts of water. Into the clear solution thus obtained 85 parts of gaseous ethylene oxide are introduced between 90° and 100° C. The ethylene oxide is readily absorbed and a clear aqueous solution of a condensation product having a strong alkaline reaction is obtained.

Example 3

100 parts of an aqueous 70 per cent amine oxide are as indicated in Example 2 caused to react with 200 parts of propylene oxide after adding 200 parts of water at 90° C. in a closed vessel until pressure is no longer detectable. In this manner a viscose condensation product is obtained which possesses a strong alkaline reaction.

Example 4

110 parts of trimethylamine oxide monohydrate are heated together with 200 parts of ethylene oxide at from 90° to 100° C. until the whole ethylene oxide employed has reacted with the amine oxide. The condensation product obtained is separated by filtration from some unaltered trimethylamine oxide. It is a viscose mass having a strong alkaline reaction.

The solution obtained is evaporated to dryness and the product obtained is dissolved in concentrated sulphuric acid while maintaining a temperature of about 10° C. The sulphonation mixture is stirred for about 3 hours and then poured onto ice. The solution thus obtained has a high washing and dispersing power.

What I claim is:

1. The process of producing nitrogenous condensation products suitable as assistants in the textile and other industries which comprises causing an amine oxide of tertiary amines to react at a temperature above 50° C. and in the presence of water with an alkylene oxide.

2. The process of producing nitrogenous condensation products suitable as assistants in the textile and other industries which comprises causing an amine oxide of tertiary amines to react at a temperature above 50° C. and in the presence of water with ethylene oxide.

3. The process of producing nitrogenous condensation products suitable as assistants in the textile and other industries which comprises causing a trialkylamine oxide to react at a temperature above 50° C. and in the presence of water with ethylene oxide.

4. The process of producing nitrogenous condensation products suitable as assistants in the textile and other industries which comprises causing an amine oxide of a tertiary amine containing at least one high-molecular aliphatic radicle in the molecule to react at a temperature above 50° C. and in the presence of water with ethylene oxide.

5. The process of producing nitrogenous condensation products suitable as assistants in the textile and other industries which comprises causing a trialkylamine oxide containing at least one aliphatic radicle with from 8 to 18 carbon atoms in the molecule to react at a temperature above 50° C. and in the presence of water with ethylene oxide.

6. The process of producing nitrogenous condensation products suitable as assistants in the textile and other industries which comprises causing an amine oxide of tertiary amines to react at a temperature above 50° C. and in the presence of water with an alkylene oxide and sulphonating the condensation product obtained.

7. A nitrogenous condensation product suitable as an assistant in the textile and other industries which comprises essentially a compound containing four organic radicles selected from the class consisting of aliphatic and aromatic radicles, at least one of which is a polyoxyalkylene radicle attached to a pentavalent nitrogen atom and a hydroxy group attached to the nitrogen atom.

8. A nitrogenous condensation product suitable as an assistant in the textile and other industries which comprises essentially a compound containing four organic radicles selected from the class consisting of aliphatic and aromatic radicles, at least one of which is a polyoxyethylene radicle attached to a pentavalent nitrogen atom and a hydroxy group attached to the nitrogen atom.

9. A nitrogenous condensation product suitable as an assistant in the textile and other industries which comprises essentially a compound containing four aliphatic radicals at least one of which is a polyoxyethylene radicle attached to a pentavalent nitrogen atom and a hydroxy group attached to the nitrogen atom.

10. A nitrogenous condensation product suitable as an assistant in the textile and other industries which comprises essentially a compound containing four organic radicles selected from the class consisting of aliphatic and aromatic radicles, at least one of which is a polyoxyethylene radicle attached to a pentavalent nitrogen atom and a hydroxy group attached to the nitrogen atom and at least one of the organic radicles is a high molecular aliphatic chain.

11. A nitrogenous condensation product suitable as an assistant in the textile and other industries which comprises essentially a compound containing four organic radicles selected from the class consisting of aliphatic and aromatic radicles, at least one of which is a polyoxyethylene radicle attached to a pentavalent nitrogen atom and a hydroxy group attached to the nitrogen atom and at least one of the organic radicles is an aliphatic chain with from 8 to 18 carbon atoms.

12. A nitrogenous condensation product suitable as an assistant in the textile and other industries which comprises essentially a compound containing four aliphatic radicles at least one of which is a polyoxyalkylene radicle attached to a pentavalent nitrogen atom and a hydroxy group attached to the nitrogen atom and at least one sulphuric acid group attached to one of the organic radicles.

13. A nitrogeneous condensation product suitable as an assistant in the textile and other industries which comprises essentially a compound containing four organic radicles selected from the class consisting of aliphatic and aromatic radicles, at least one of which is a polyoxyalkylene radicle attached to a pentavalent nitrogen atom and a hydroxy group attached to the nitrogen atom and at least one —$SO_3$-group attached by an oxygen atom to the polyoxyalkylene radicle.

14. A nitrogenous condensation product suitable as an assistant in the textile and other industries which comprise essentially a compound containng four organic radicles selected from the class consisting of aliphatic and aromatic radicles, at least one of which is a polyoxyalkylene radicle attached to a pentavalent nitrogen atom and a negative substituent attached to the nitrogen atom.

15. A nitrogenous condensation product suitable as an assistant in the textile and other industries which comprise essentially a compound containing four organic radicles selected from the class consisting of aliphatic and aromatic radicles, at least one of which is a polyoxyalkylene radicle attached to a pentavalent nitrogen atom and an acid substituent attached to the nitrogen atom.

HEINRICH ULRICH.